United States Patent
Pountney

(10) Patent No.: US 6,974,290 B2
(45) Date of Patent: Dec. 13, 2005

(54) CONNECTING ASSEMBLY FOR JOINING TWO PANELS AND MOUNTING THE JOINED PANELS ON A SUPPORT

(75) Inventor: David Grenville Pountney, Auckland (NZ)

(73) Assignee: Dynamic Marketing Group Limited, Auckland (NZ)

( * ) Notice: Subject to any disclaimer, the term of this patent is extended or adjusted under 35 U.S.C. 154(b) by 19 days.

(21) Appl. No.: 10/212,241

(22) Filed: Aug. 6, 2002

(65) Prior Publication Data

US 2003/0068210 A1 Apr. 10, 2003

Related U.S. Application Data

(63) Continuation-in-part of application No. 09/719,873, filed as application No. PCT/NZ99/00091 on Jun. 23, 1999, now Pat. No. 6,470,612.

(30) Foreign Application Priority Data

| Jun. 26, 1998 | (NZ) | 330810 |
| Aug. 14, 1998 | (NZ) | 331393 |
| Aug. 31, 1998 | (NZ) | 331630 |

(51) Int. Cl.$^7$ ............................................. F16B 35/02
(52) U.S. Cl. ........................ 411/384; 411/178; 411/338; 411/400; 411/401
(58) Field of Search ................................ 411/384, 178, 411/338, 400, 401

(56) References Cited

U.S. PATENT DOCUMENTS

| 157,618 A | * | 12/1874 | Mantey | 16/2.4 |
| 545,834 A | * | 9/1895 | Williamson | 30/267 |
| 1,440,576 A | * | 1/1923 | Astrom | 403/3 |
| 1,621,582 A | * | 3/1927 | Collamore | 40/209 |
| 1,842,741 A | * | 1/1932 | Bengtsson | 40/203 |

(Continued)

FOREIGN PATENT DOCUMENTS

| DE | 296 22 046 | 2/1997 |
| EP | 0 698 717 | 2/1996 |
| FR | 2 580 739 | 10/1986 |

Primary Examiner—Daniel P. Stodola
Assistant Examiner—Carlos Lugo
(74) Attorney, Agent, or Firm—Young & Thompson

(57) ABSTRACT

An assembly and method for mounting tow or more panels where a first member is mounted to, into or from a support, a second member is threaded to the mounted first member, and a third member is threaded to the second member when it is already threadingly engaged to the mounted first member, wherein the second member has a portion extending through a hole in a first panel and into the first member so as to retain between the first and second member the first panel, and wherein the third member has a portion extending through a hole in a first panel and into the second member so as to retain between the first and second member the second panel.

15 Claims, 15 Drawing Sheets

U.S. PATENT DOCUMENTS

| | | | | |
|---|---|---|---|---|
| 1,879,906 A | * | 9/1932 | Linstrom | 40/209 |
| 1,934,121 A | * | 11/1933 | Fluker | 40/203 |
| 1,967,039 A | * | 7/1934 | Mohr | 248/479 |
| 2,639,179 A | * | 5/1953 | Phelps | 292/251 |
| 2,932,405 A | * | 4/1960 | Peiffer | 211/50 |
| 3,049,323 A | | 8/1962 | Peterka | |
| 3,141,488 A | * | 7/1964 | Wooton | 411/108 |
| 3,374,568 A | * | 3/1968 | Trammel, Jr. | 40/209 |
| 3,563,131 A | * | 2/1971 | Ridley, Sr. | 411/384 |
| 3,792,933 A | * | 2/1974 | Stencel | 403/19 |
| 3,823,526 A | | 7/1974 | Rose | |
| 3,868,732 A | * | 3/1975 | Engelhart | 4/496 |
| 4,043,239 A | * | 8/1977 | DeFusco | 411/337 |
| 4,108,407 A | * | 8/1978 | Cable et al. | 248/656 |
| 4,275,263 A | * | 6/1981 | Chino | 174/152 R |
| 4,295,765 A | * | 10/1981 | Burke | 410/101 |
| 4,445,291 A | * | 5/1984 | Easley | 40/210 |
| 4,813,167 A | * | 3/1989 | Means | 40/210 |
| 4,826,378 A | * | 5/1989 | Pamer et al. | 411/338 |
| 4,848,405 A | | 7/1989 | Albrecht | |
| 4,891,895 A | * | 1/1990 | DeLaquil, Jr. | 40/209 |
| 4,903,422 A | * | 2/1990 | Varga | 40/201 |
| 4,906,036 A | * | 3/1990 | James | 292/202 |
| 5,139,361 A | * | 8/1992 | Camuffo | 403/408.1 |
| 5,397,092 A | | 3/1995 | Black | |
| 5,542,777 A | | 8/1996 | Johnson | |
| 5,624,221 A | * | 4/1997 | Poe | 411/383 |

* cited by examiner

CONNECTING ASSEMBLY FOR JOINING TWO PANELS AND MOUNTING THE JOINED PANELS ON A SUPPORT

This application is a continuation-in-part of U.S. application Ser. No. 09/719,873, filed on Mar. 8, 2001, now U.S. Pat. No. 6,470,612, which was a national stage of PCT/NZ99/00091, filed Jun. 23, 1999 which designated the United States and which claimed priority of New Zealand application Nos. 330810, 331393 and 331630, filed Jun. 26, 1998, Aug. 14, 1998 and Aug. 31, 1998, respectively.

TECHNICAL FIELD

This invention relates to an assembly for mounting two or more panels or sheets. The invention also relates to an assembly of the said two or more panels or sheets and said assembly for mounting those two or more panels or sheets.

BACKGROUND ART

Devices to mount a panel on a support are known. Specification DE-A-296 22 046 describes a construction to mount a single panel on a support.

It is also known to mount two or more and in particular two panels substantially parallel to each other. Such devices may be employed to provide display advertising wherein an item of printed matter, for example a poster, is mounted onto a panel or a wall and covered with a transparent material such as acrylic sheet. Specification EP-A-0698717 describes such a construction.

It is an object of the present invention to provide an assembly for mounting two or more panels or sheets which at least provides the public with a useful choice.

SUMMARY OF THE INVENTION

Accordingly in a first aspect the present invention consists in:

an assembly for mounting two panels or sheets (hereinafter "panel"), said assembly comprising or including:

a first member capable of being mounted to, into or from a support, a second member threadingly engageable to said mounted first member, and a third member threadingly engageable to said second member when it is already threadingly engaged to said mounted first member, wherein said second member can retain a first panel being a hole or slot) located by such hole or slot on said first member provided the hole or slot is appropriately sized, and wherein said third member can retain a second panel (having a hole or slot) located by such hole or slot on said second member provided the hole or slot is appropriately sized.

Preferably said third member can have its male threaded protuberance pushed through a sheet of paper or the like, to be interposed between said panels.

In other preferred forms of the present invention a number of said second members may be provided so as to enable multiple sheets of paper, etc, to be interposed between multiple panels.

Preferably said second panel incorporates a rebate so as to recess said second member therein.

Alternatively said first panel may be substantially planar, that is not including the rebate.

In another aspect the present invention consists in a method of mounting two or more panels or sheets "hereinafter panel" comprising or including the steps of providing a first member, said first member being mounted to, into or from a support, providing a second member threadably engageable with said mounted first member, and providing a third member threadably engageable to said second member when it is threadfully engaged to said mounted first member, retaining a first panel having a hole or slot therein located by such a hole or slot on said first member by threadably engaging said second member to said first member, and retaining a second panel by means of threadably engaging said third member to said second member through an appropriately sized hole or slot in said second panel.

Preferably when said third member is engaged with said second member the male portion of said third member pierces printed matter such as a poster.

BRIEF DESCRIPTION OF DRAWINGS

Preferred forms of the present invention will now be described with reference to the accompanying drawings in which.

Figure 1:
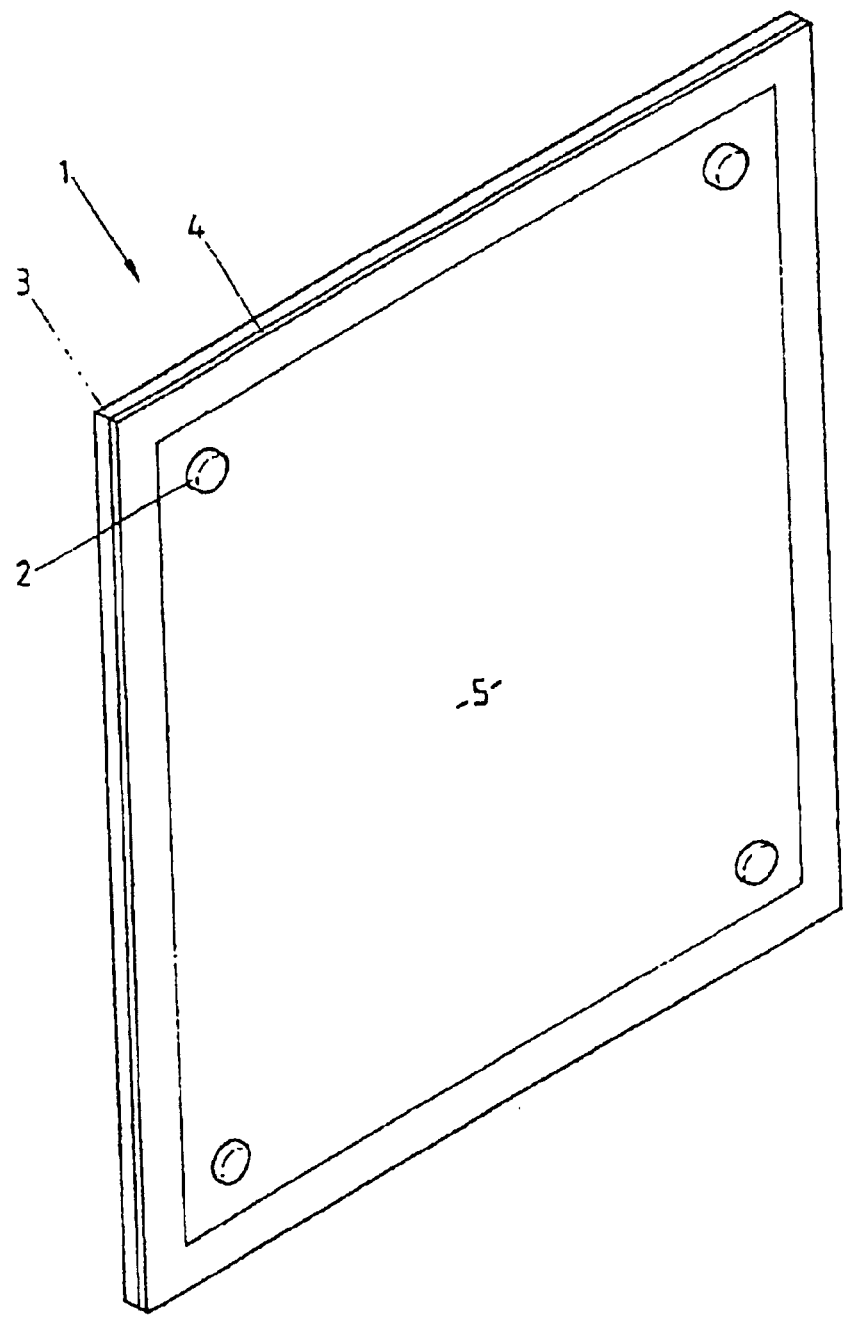
FIG. 1 shows a perspective view of an assembly of two panels 1 according to a preferred form of the present invention, the panels 3 and 4 are mounted substantially parallel and overlying each other by means of an assembly for mounting two or more panels of sheets 2, the assembly 1 incorporates, between said first 3 and second 4 panel, a sheet 5, said sheet being preferably a sheet of printed paper or card or similar, for example advertising for other graphic work; the second sheet 4 is preferably of a perspex or other suitable transparent or translucent second material.
Figure 2:
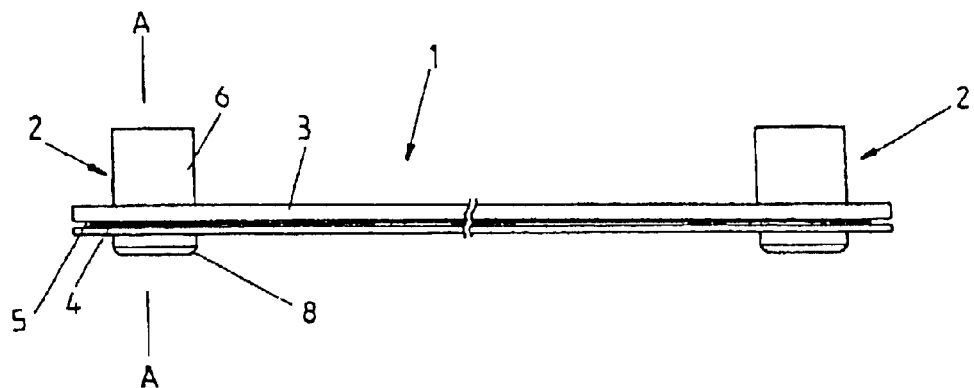
FIG. 2 shows a top and, given the shape of the preferred form of the present invention illustrated, bottom and side views of an assembly 1 according to a preferred form of the present invention, it should be noted that various shapes of the panels 3 and 4 are contemplated by the present invention, for example squares, rectangles or other shapes including various straight side or planar shapes and also shapes incorporating curves such as circular panels, the FIG. 2 also shows the assembly for mounting two or more panels or sheets 2 and shows the first member 6 and the third member 8, the second member 7 is not shown in this figure as it is not visible due to the fact that in some preferred forms of the invention it is rebated into the first panel 3.
Figure 7A:
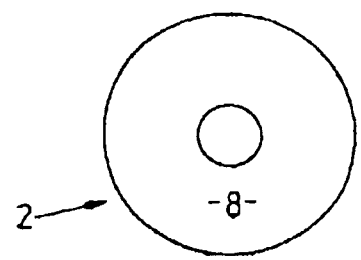
Figure 7B:
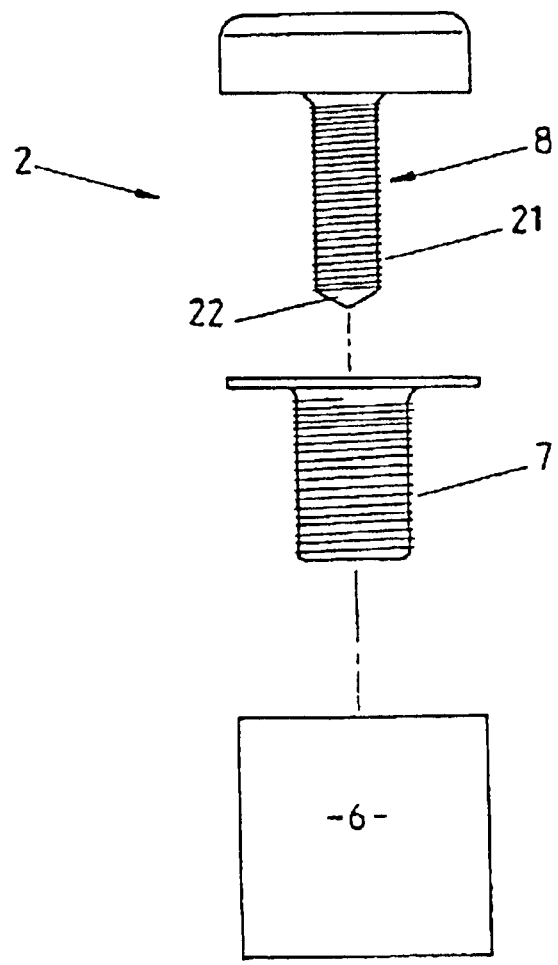

a plan view;

a cross-sectional side view and a simple side view of an assembly for mounting two panels or sheets 2 according to a preferred form of the present invention, the drawings illustrate that the thread 20 of said first member 6 is female whereas the thread 21 of the third member is male, also shown in the figures is the piercing point 22 on said third member 8 which enables it to be pushed through a sheet of paper, etc, which is interposed between said first and second panels 3 and 4;

FIGS. 7A and 7B show, respectively, a bottom plan view of a third member 8 and an exploded view of an assembly of the present invention.

Figure 8:
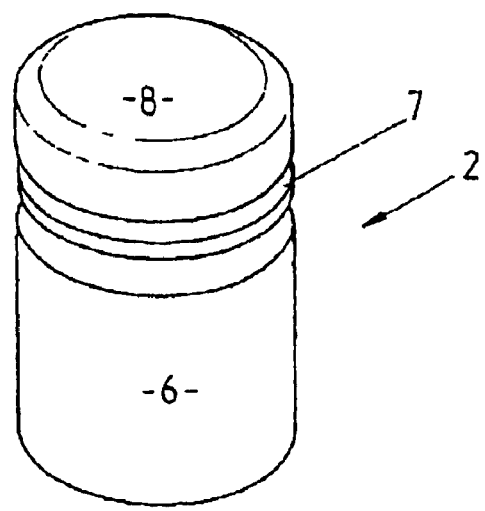
Figure 9:
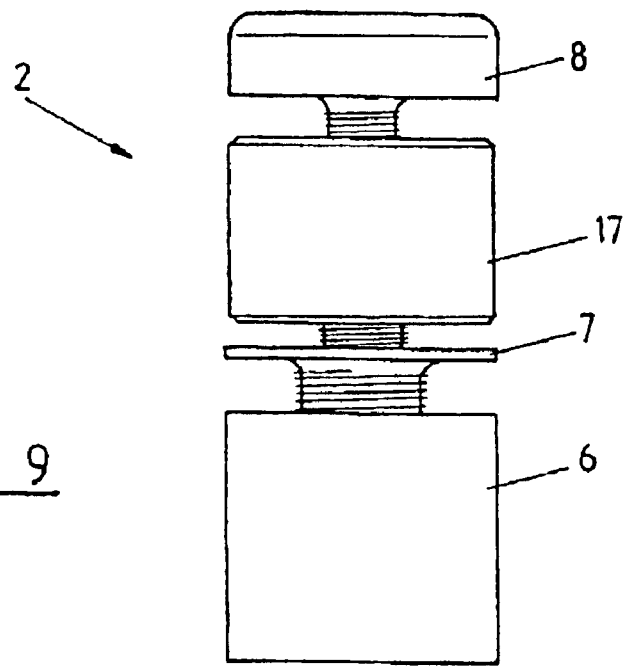
Figure 10:
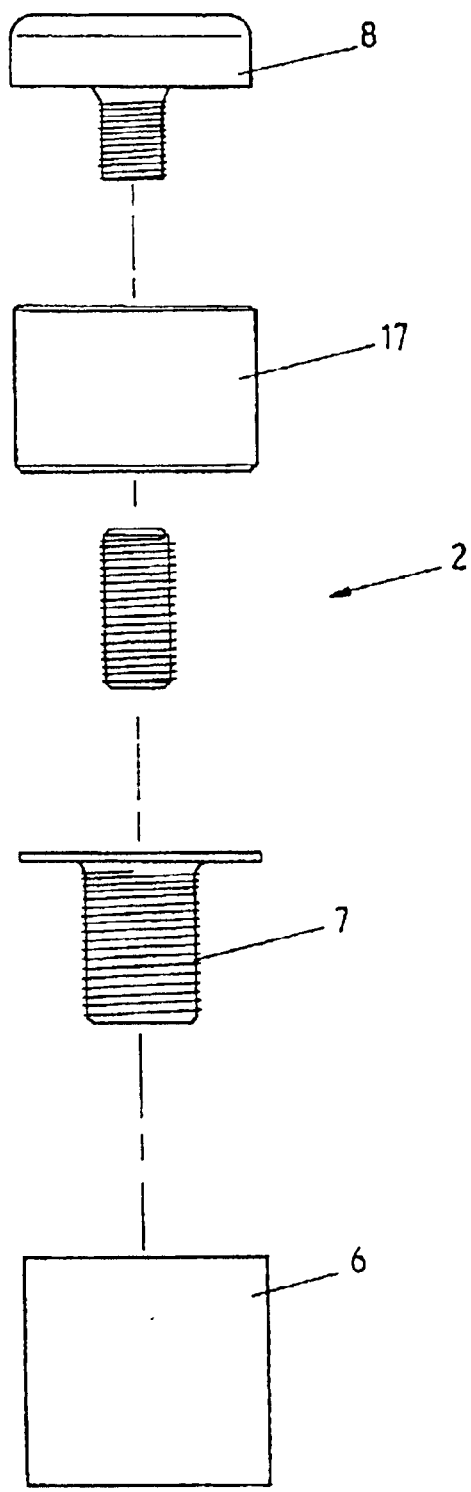
Figure 11:
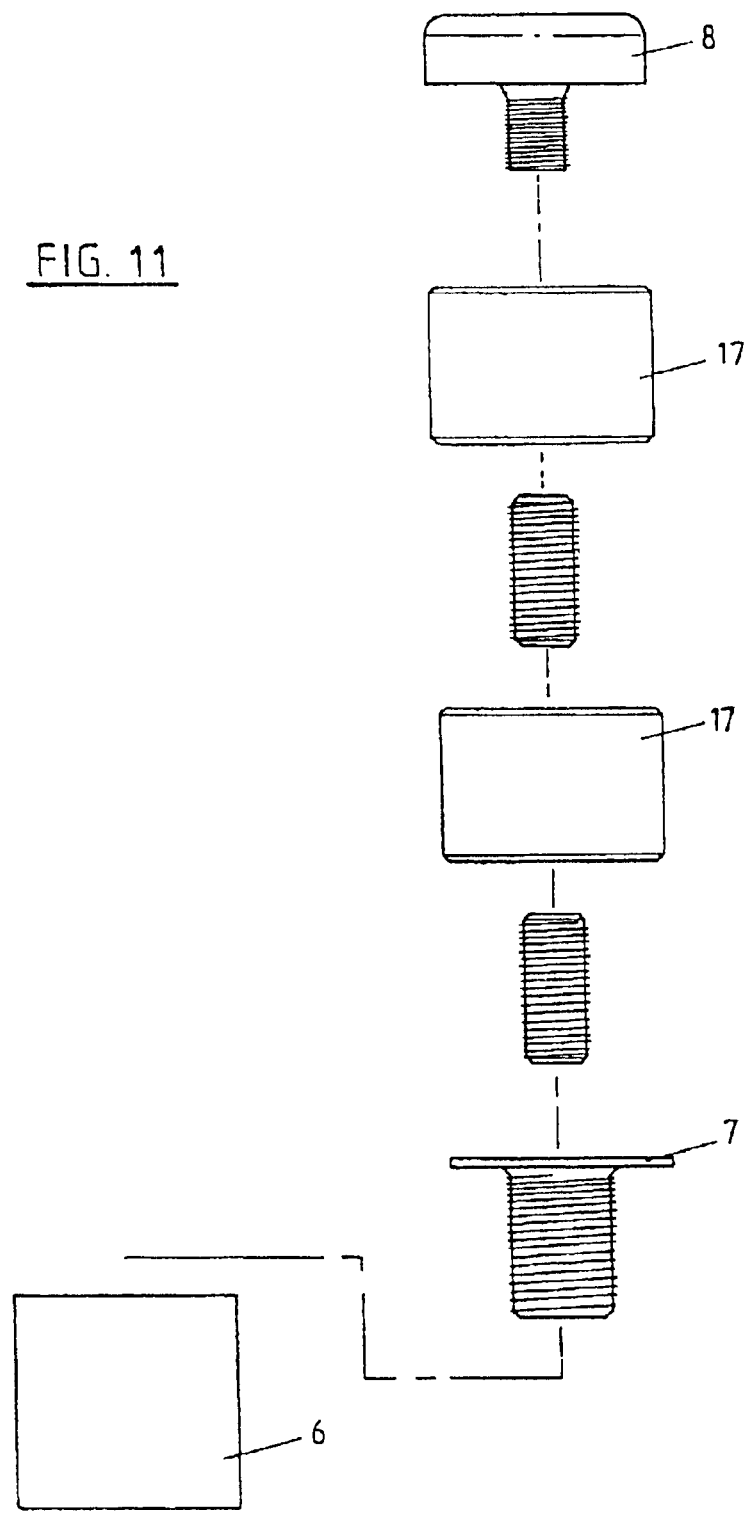
Figure 12A:
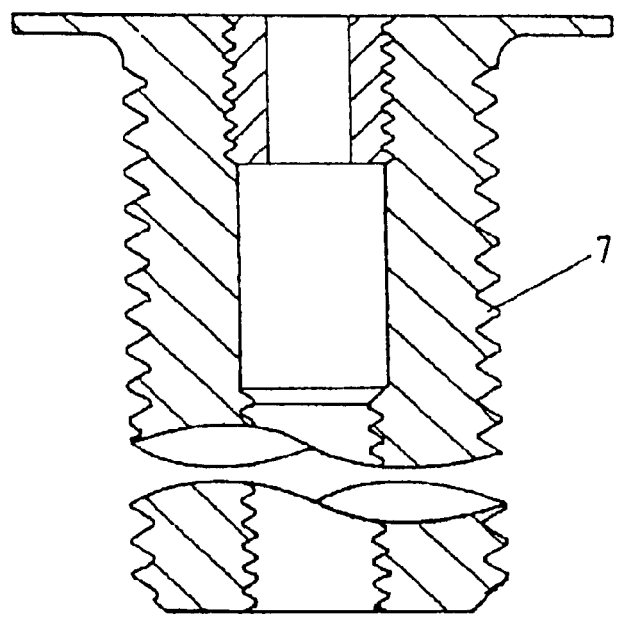
Figure 12B:
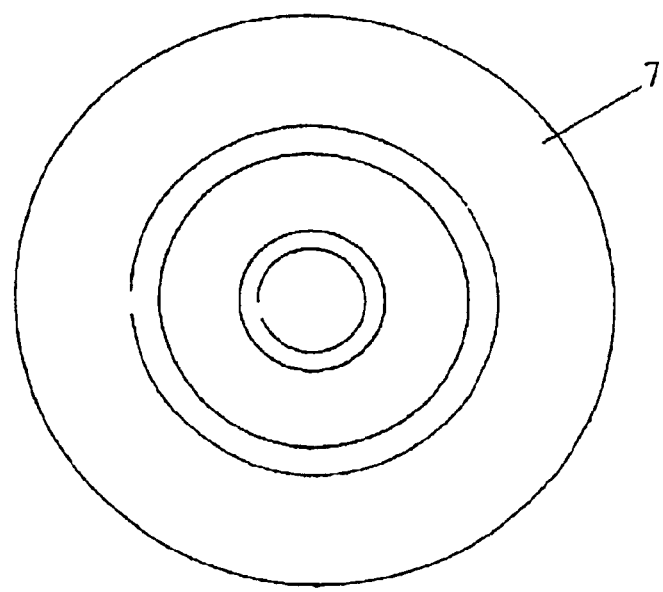
Figure 13A:
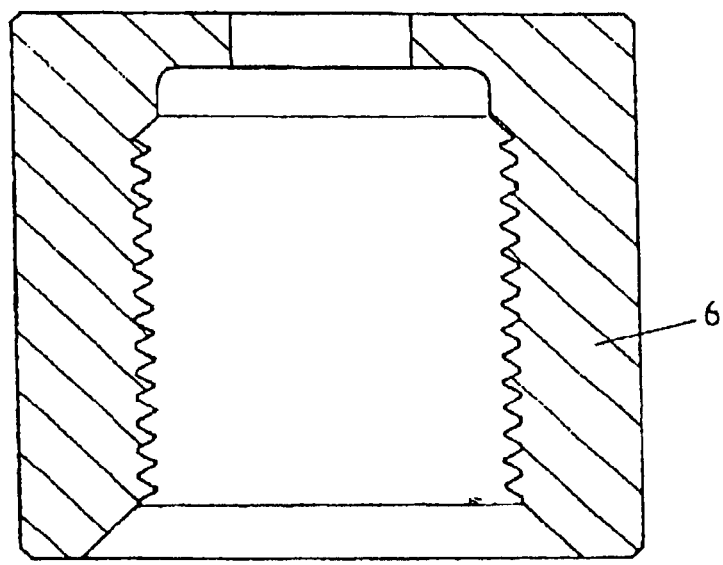
Figure 13B:
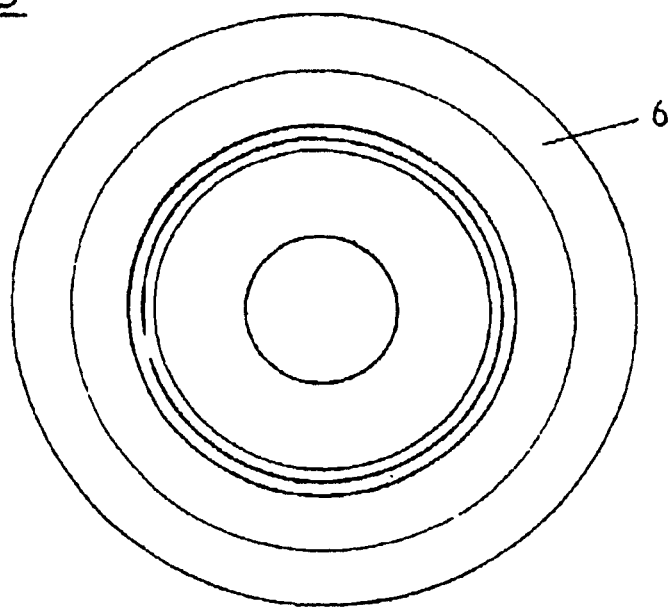
Figure 14A:
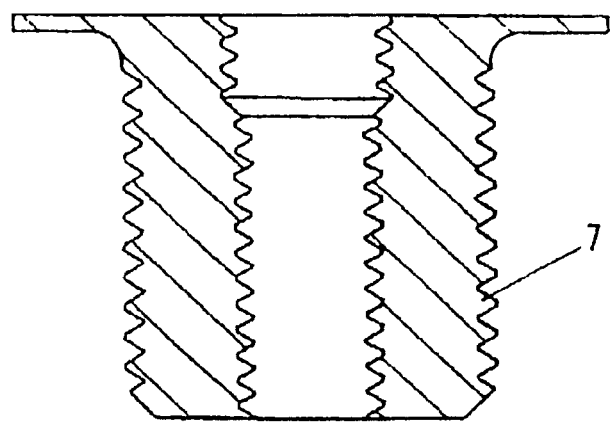
Figure 14B:
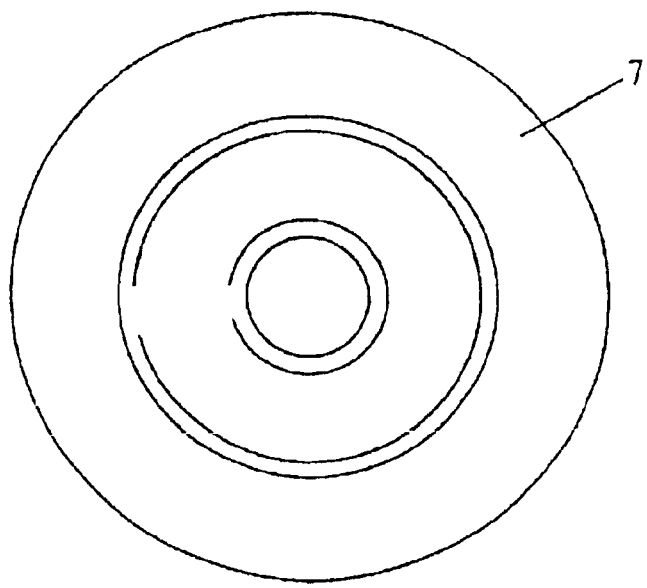
Figure 15:
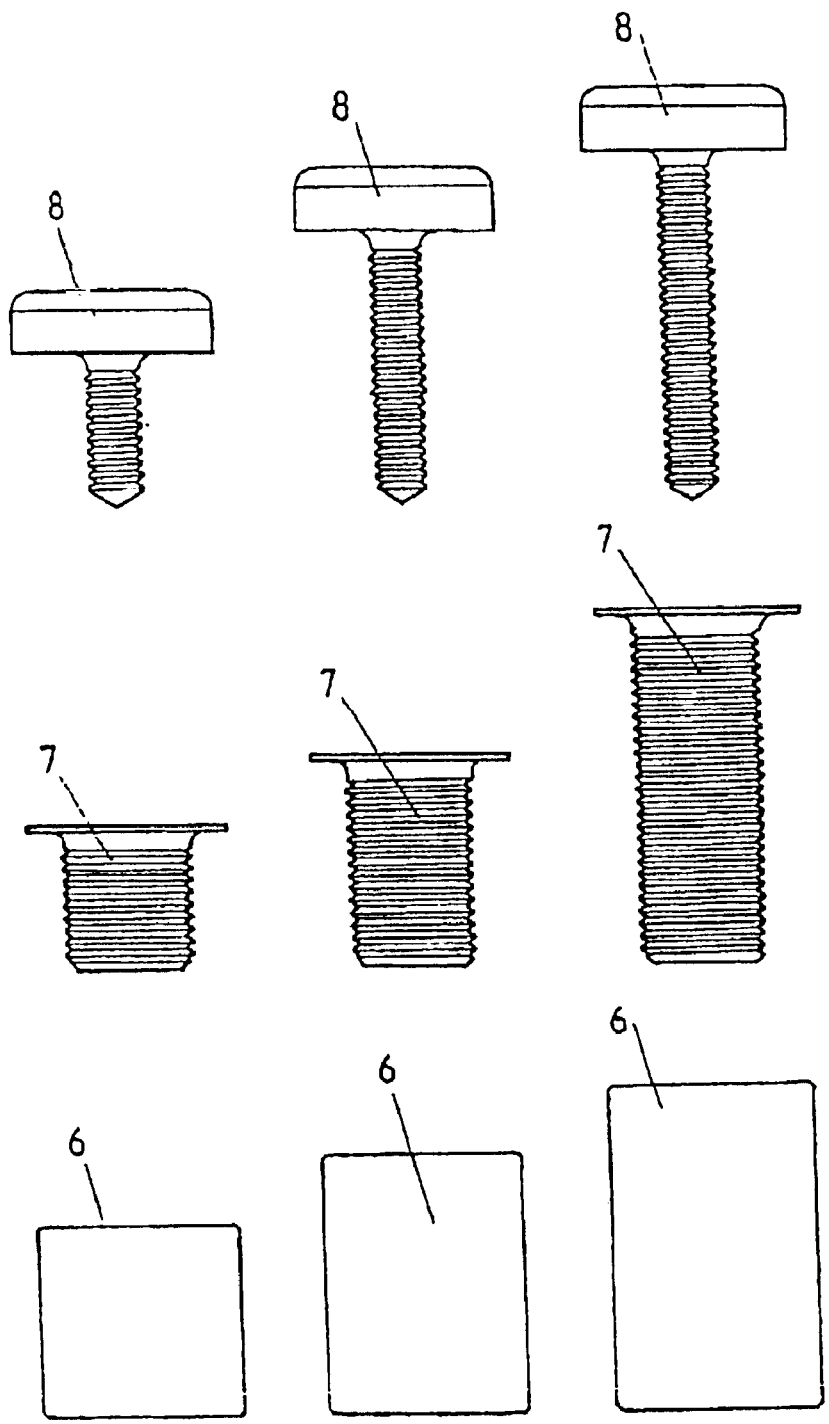
Figure 16:
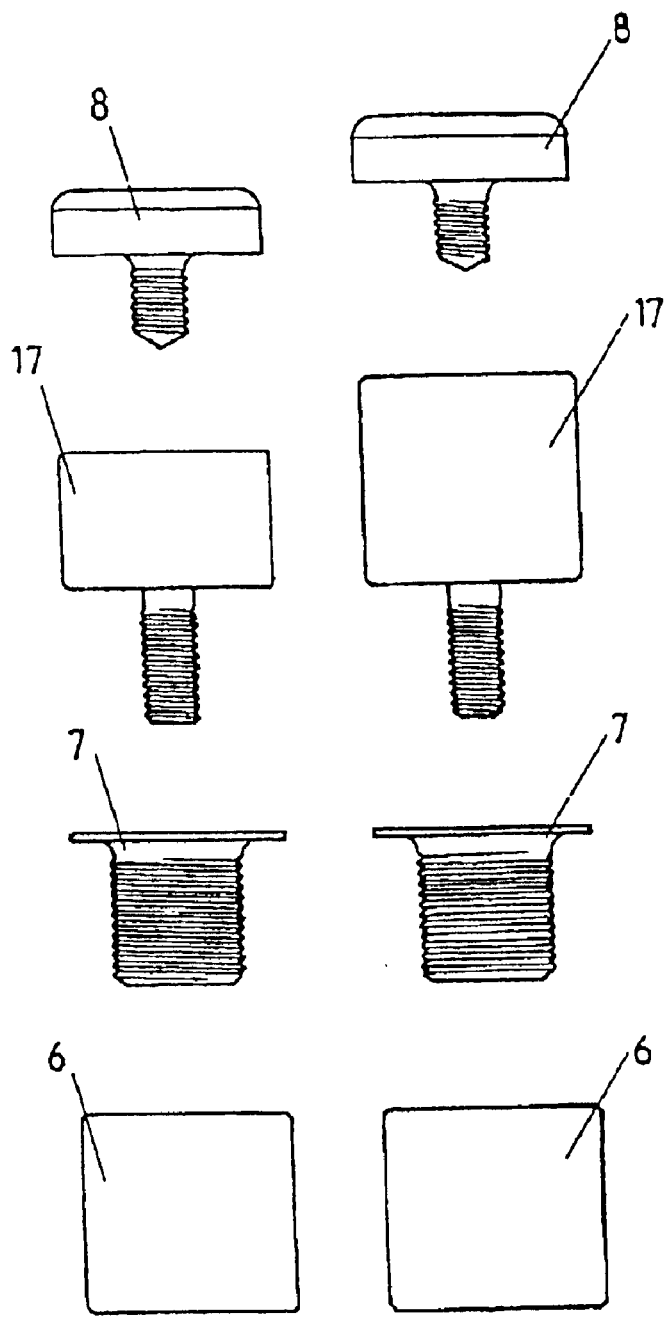
Figure 17:
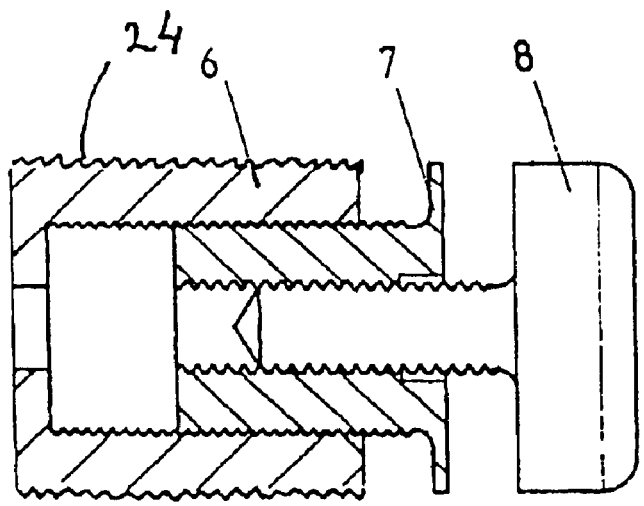
Figure 18:
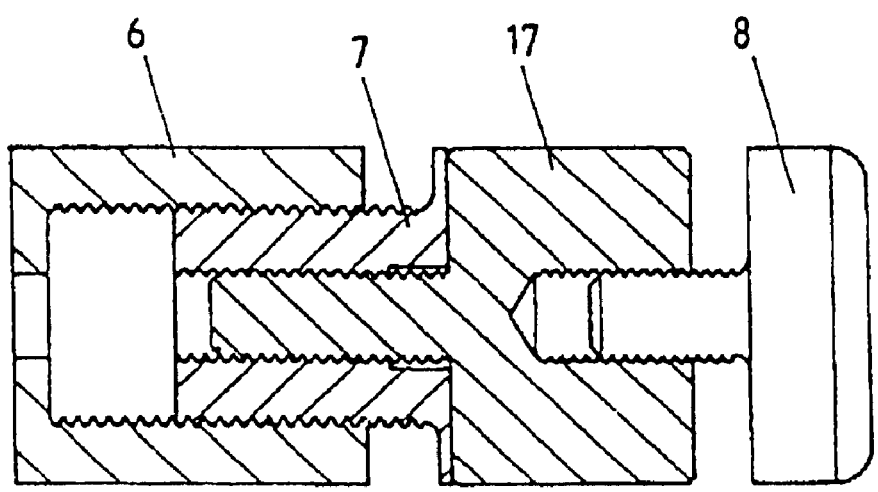
Figure 19:
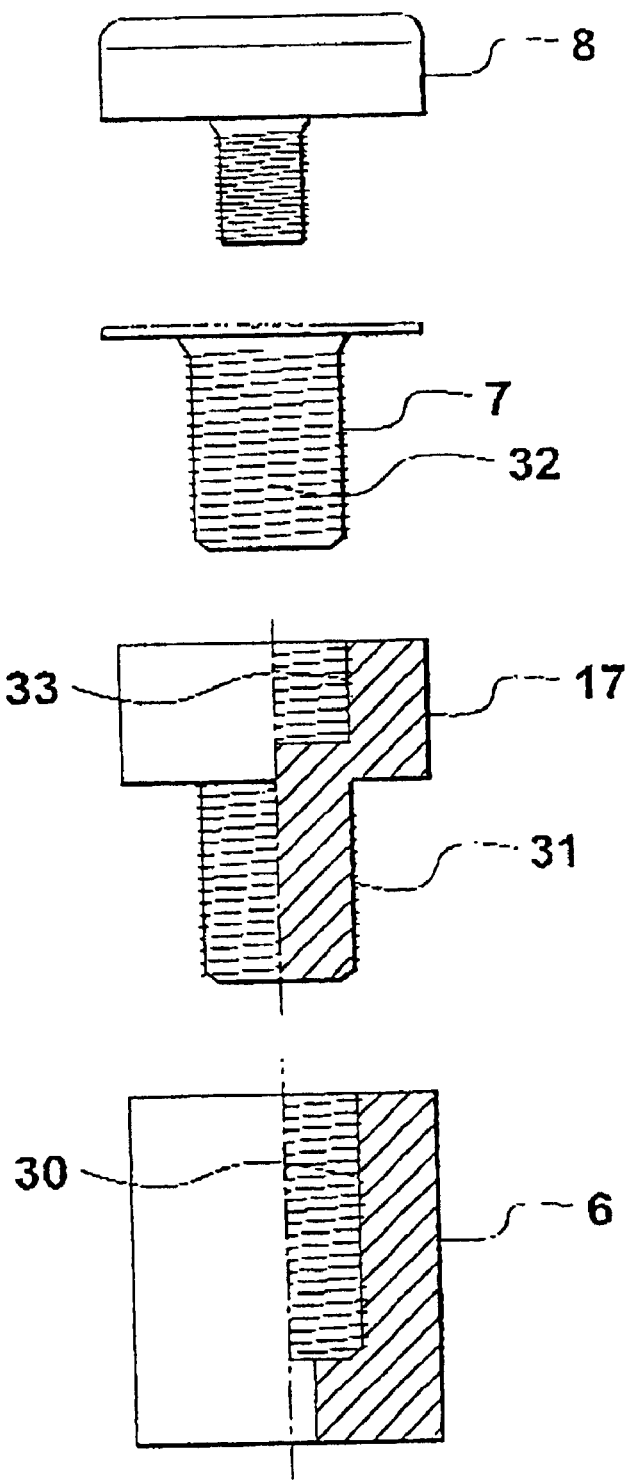

FIG. 8 shows a perspective view of an assembly for mounting two or more panels or sheets according to a preferred form of the present invention showing the first member 6, second member 7, and third member 8;

FIG. 9 shows a side view of another preferred form of the present invention which provides an assembly 2 for mounting panels or sheets, in this form of the present invention additional second members 7 are provided, these second members are designated by 17 in the FIG. 9, in other forms of the invention multiple, for example three or four second members 7 may be provided, this form of the present invention allows for a further number of panels or sheets of printed matter to be mounted adjacent each other or enables layers of sheets of paper which include graphic works, for example is designed by 5 in the previous figures to be mounted on top of each other, such an arrangement may provide for a layering effect of the graphic work;

FIG. 10 shows a side view of an assembly for mounting panels 2 according to a preferred form of the present invention, said figures showing the additional second member 17;

FIG. 11 shows a side view of another form of the present invention wherein a third second member 27 is provided;

FIG. 12 is a cross sectional view of another form of the member 6 as per a preferred form of the present invention;

whereas FIG. 12b is a plan view of such a member 7;

FIG. 13a is a cross sectional view of a member 6 according to another preferred form of the present invention;

FIG. 13b is a plan view of such a member 6;

FIGS. 14a and b show a cross sectional view of the plan of yet another member 7 according to a preferred form of the present invention;

FIG. 15 shows various standard units as outlined in Table 1 and 2;

FIG. 16 shows side elevations of various members as outlined in Table 3;

FIG. 17 shows a unit where the first member 6 has an external thread to allow it to be secured into an aperture such as a hole in a wall or the like to allow screw-like engagement;

FIG. 18 shows incorporation of a further second member, for example as shown in FIG. 16 in an assembled form of the present invention, and FIG. 19 is a view as in FIG. 16 (but partly in cross-section) of an alternative construction.

DESCRIPTION OF THE PREFERRED EMBODIMENT

The present invention provides assemblies for mounting two or more panels or sheets, such an arrangement is often employed in the advertising industry to enable printed matter such as printed sheets to be displayed. It is often the case that a graphic work such as an advertisement is required to be displayed mounted on a first panel 3 but protected by a second panel 4 which may comprise, for example, a perspex sheet.

As shown in the figures the present invention provides an assembly for mounting two or more panels or sheets 3,4. The assembly comprises a first member 6, said first member is capable of being mounted to, onto, into or from a support which may be a support surface such as a wall. Such mounting may take the form of a screw or bolt 23 or may simply comprise adhesive mounting, for example by use of glue. In other forms of the invention the first member 6 may be unitary with said support surface, for example, it may be moulded onto the interior surface of a transport vehicle such as a train, ferry or bus. The first member may also for example be provided with an external thread 24 as shown in FIG. 17 for the threading of the first member at least in part into a hole or aperture. The thread 24 may be such as to allow the first member to thread into a threaded aperture or alternatively maybe provided with for example a tapper such as to allow this member to be screw threaded into a hole in for example a wood or metal or the like. The first member 6 should be of a material suitable to have a female thread 20 therein. In preferred forms of the invention the first member 6 has a hole drilled therethrough and a thread placed on an internal surface of said hole. Those skilled in the art to which the invention relates will be aware of many techniques for including such a thread.

The second member 7 may take a variety of forms but should include a portion which has a thread capable of engaging with the female thread 20 of said first member 6. In the preferred form of the present invention wherein a single second member 7 is provided, said second member should include a portion having a female thread therein which is engageable with the male thread 21 of said third member 8. In the alternative preferred forms of the invention wherein multiple second members are provided, for example, 17 as shown in FIG. 11, said first second member 7 includes a thread, preferably female, which is engageable with a thread preferably male on said additional said second member.

TABLE 1 shows the dimensions of a standard unit in assembly according to a preferred form of the present invention utilising components of the preferred standard size.
Standard Unit

| Spacing Off Wall | Back Panel | Front Panel | Components |
|---|---|---|---|
| 15 mm | 0–6 mm | 0–7 mm | A1 + B1 + C2 |

TABLE 2 shows the use of variously sized components to provide an assembly as per other preferred forms of the present invention.
Standard Unit

| Spacing Off Wall | Back Panel | Front Panel | Components |
|---|---|---|---|
| 15 mm | 0–6 mm | 0–1 mm | A1 + B1 + C1 |
| 15 mm | 0–6 mm | 0–7 mm | A1 + B1 + C2 |
| 15 mm | 3–6 mm | 7–16 mm | A1 + B1 + C3 |
| 15 mm | 0–6 mm | 10–16 mm | A1 + B1 + C3 |
| 15 mm | 0–6 mm | 16–22 mm | A1 + B1 + C4 |
| 15 mm | 6–11 mm | 0–1 mm | A1 + B2 + C1 |
| 15 mm | 6–11 mm | 0–7 mm | A1 + B2 + C2 |
| 15 mm | 6–11 mm | 5–16 mm | A1 + B2 + C3 |
| 15 mm | 6–11 mm | 11–22 mm | A1 + B2 + C4 |
| 15 mm | 17–22 mm | 0–8 mm | A1 + B3 + C3 |
| 15 mm | 17–22 mm | 0–14 mm | A1 + B3 + C4 |
| 20 mm | 0–6 mm | 0–1 mm | A2 + B1 + C1 |
| 20 mm | 0–6 mm | 0–7 mm | A2 + B1 + C2 |
| 20 mm | 0–6 mm | 10–16 mm | A2 + B1 + C3 |
| 20 mm | 0–6 mm | 16–22 mm | A2 + B1 + C4 |
| 20 mm | 0–11 mm | 0–1 mm | A2 + B2 + C1 |
| 20 mm | 0–11 mm | 0–7 mm | A2 + B2 + C2 |
| 20 mm | 0–11 mm | 5–16 mm | A2 + B2 + C3 |
| 20 mm | 0–11 mm | 11–22 mm | A2 + B2 + C4 |
| 20 mm | 8–22 mm | 0–8 mm | A2 + B3 + C3 |
| 20 mm | 8–22 mm | 0–14 mm | A2 + B3 + C4 |
| 25 mm | 0–6 mm | 0–1 mm | A3 + B1 + C1 |
| 25 mm | 0–6 mm | 0–7 mm | A3 + B1 + C2 |
| 25 mm | 0–6 mm | 10–16 mm | A3 + B1 + C3 |
| 25 mm | 0–6 mm | 16–22 mm | A3 + B1 + C4 |
| 25 mm | 0–11 mm | 0–1 mm | A3 + B2 + C1 |
| 25 mm | 0–11 mm | 0–7 mm | A3 + B2 + C2 |
| 25 mm | 0–11 mm | 5–16 mm | A3 + B2 + C3 |
| 25 mm | 0–11 mm | 11–22 mm | A3 + B2 + C4 |
| 25 mm | 7–22 mm | 0–8 mm | A3 + B3 + C3 |
| 25 mm | 7–22 mm | 0–14 mm | A3 + B3 + C4 |

TABLE 3 shows yet another preferred form of the present invention in which a spacer is provided between the sheets or panels.
Standard Unit

| Spacing Off Wall | Back Panel | Front Panel | Components |
|---|---|---|---|
| 15 mm | 0–6 mm | 0–3 mm | A1 + B1 + C1 + D1 |
| 15 mm | 0–6 mm | 0–3 mm | A1 + B1 + C1 + D2 |
| 15 mm | 6–11 mm | 0–3 mm | A1 + B2 + C1 + D1 |
| 15 mm | 6–11 mm | 0–3 mm | A1 + B2 + C1 + D2 |
| 20 mm | 0–6 mm | 0–3 mm | A2 + B1 + C1 + D1 |
| 20 mm | 0–6 mm | 0–3 mm | A2 + B1 + C1 + D2 |
| 20 mm | 0–11 mm | 0–3 mm | A2 + B2 + C1 + D1 |
| 20 mm | 0–11 mm | 0–3 mm | A2 + B2 + C1 + D2 |
| 25 mm | 0–6 mm | 0–3 mm | A3 + B1 + C1 + D1 |
| 25 mm | 0–6 mm | 0–3 mm | A3 + B1 + C1 + D2 |
| 25 mm | 0–11 mm | 0–3 mm | A3 + B2 + C1 + D1 |
| 25 mm | 0–11 mm | 0–3 mm | A3 + B2 + C1 + D2 |

In preferred forms of the invention said third member 8 includes a point or protuberance 22 thereon, said point 22 being capable of piercing sheets which is printed paper. In other forms of the invention said third member 8 has no such point and accordingly a suitable aperture should be placed through said printed sheet for it is incorporated into said assembly. An appropriately shaped top region 26 of the internal thread of the second member 7 can be provided such as to allow for, for example an allan key or slot for a screw drive, or the like securing means to tighten the second member in its fully engaged condition. The top region is preferably of a shape to receive and to allow the second member to be drive by such a fastening means as an allan key.

Said first 6, second 7, and third 8 members are produced from a variety of several materials. For example, may be produced from a variety of suitable materials. For example, may be produced from a suitable metal and may for example be machined out of a suitable diameter rod of said metal. Other forms of the invention may comprise moulded members. As mentioned previously said second member 7 may be rebated into said first panel 3 or may in other forms of the invention overly said panel 3. In the forms of the invention where it is rebated the second panel 4 may be brought down into close contact with said printed sheet 5 and said first panel 3. This may help keep the printed sheet 5 flat.

In forms of the invention which employ multiple second members 7, for example 17, a number of printed sheets 5 may overlie each other. Such a preferred form of the present invention may be employed to provide an interesting visual effect, for example a layering of transparent or translucent printed sheets 5. For example it may comprise the use of a printed sheet 5 which is a second sheet material overlying it. Said second sheet material may comprise for example a translucent filter, which may be coloured, to provide an interesting visual effect.

As mentioned previously said second sheet 4 preferably provides protection to said printed sheet 5. As such it may be used from a variety of materials such as perspex, other clear or translucent sheet, plastics material or it may comprise glass. A wide variety of materials may be used to produce said first sheet 3. For example it may comprise a sheet of wood or wood product such as medium density fibreboard. In other forms of the invention it may comprise a sheet of suitable plastic material such as perspex. The sheet material may be translucent, transparent or opaque. In other forms of the invention the first sheet 3 may comprise a sheet of metal.

Figure 3:
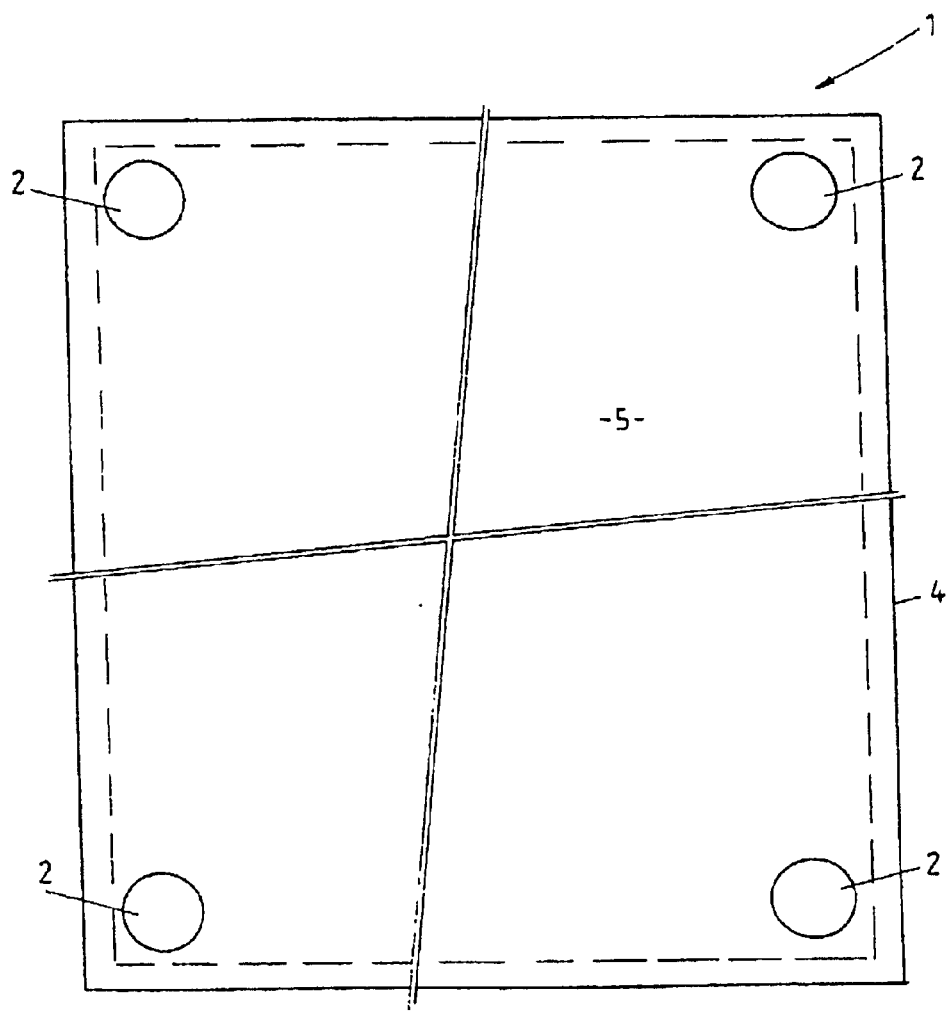
FIG. 3 shows a front view of an assembly of two panels mounted using assemblies for mounting panels according to a preferred form of the present invention, as mentioned above this preferred form of the invention shows a rectangular panel having the assemblies for mounting two panels or sheets at each corner thereof, although this is a preferred form of the invention, other shapes and positionings for the assemblies 2 are envisaged, the dotted outline in FIG. 3 shows the outline of the sheet of paper or card which is sandwiched between said first 3 and second 4 panels, the sheet 5 is at least partially visible beneath said second panel 4 as said second panel 4 is transparent or at least translucent, other forms of the invention are contemplated wherein said first panel 3 is transparent or at least partially translucent and illumination means are provided on said support from which said first member 6 is mounted, in use, this may provide a degree of illumination of the sheet material 5.
Figure 4:
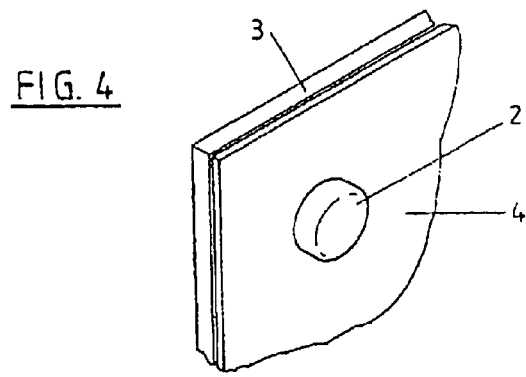
FIG. 4 shows a partial perspective view showing the arrangement of the first panel 3 and second panel 4 in relation to each other being engaged with said assembly for mounting two panels or sheets 2.
Figures 5A, 5B:
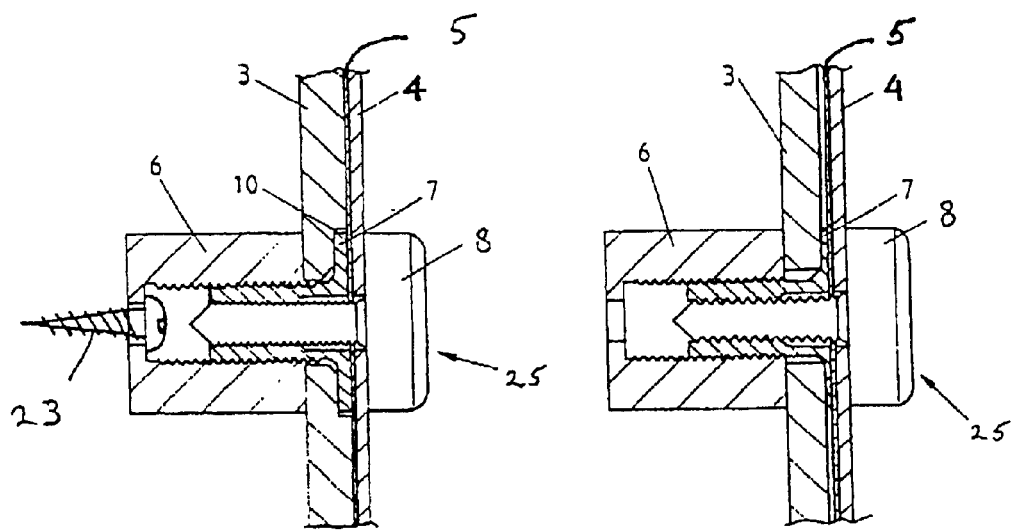
FIG. 5A shows a perspective view through A—A showing the first member 6, said second member 7 which is not visible in the previous figures, and the third member 8, the figure shows the recess or rebate 10 in said first panel 3 into which said second member 7 sits, the surface of the said first panel 3 adjacent said second panel 4 is thus flush, in other forms of the invention there may be no recess or rebate 10 and the second member 7 may sit atop the first sheet 3, although in preferred forms of the invention the first, second and third members are substantially cylindrical, it is possible there may be other forms of the invention in which this is not the case, for example the members may be octagonal or hexagonal or other shapes.
FIG. 5B is the same as FIG. 5A except that the need for the recess 10 is avoided through the use, as shown in later drawings, of a thinner flange 7.
Figure 6A:
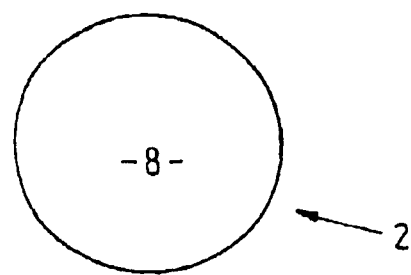
FIGS. 6 A, B and C show respectively.
Figure 6B:
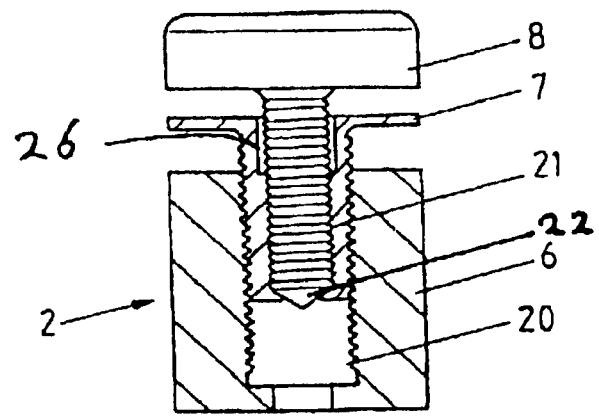
Figure 6C:
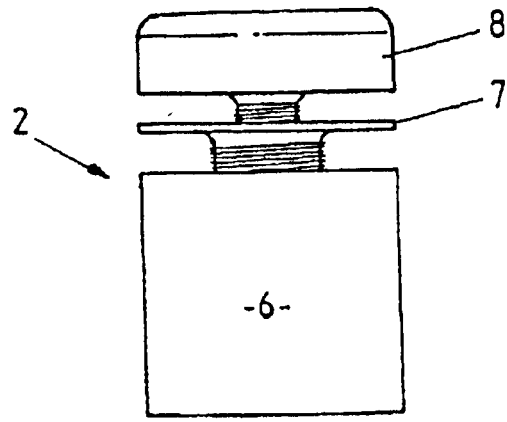

Preferably, as shown in at least FIG. 5B recesses 10 are provided by the provision of very thin Flanges 7. The flange may be about 0.5 mm to 1 mm preferably about 0.6 mm thick. The method of assembly using the invention as herein described preferably comprises the steps of securing the first member 6 to a support either by a thread engaging means 23 as for example shown in FIG. 5A or by an adhesive or alternatively by for example threading the first member into a hole of a support utilising for example an external thread as shown in FIG. 17. Any number of suitably spaced units can be provided on such a support and, in for example FIG. 3, there are provided four such assemblies. A first sheet, with aperture(s) can then be secured to the or each of the assemblies by threading said second member into the thread of said first member.

This then located relative to the first members, the first sheet of material. A second sheet can then be secured to lie substantially parallel to the first sheet, and can be held in a fixed relationship by threading the member 8 into the member 7. Between the sheets printed member matter 5 may be provided. Such printed member can be for example any advertising carrying substrate, menu board, highrise building floor numbering or any similar or the like matter.

The substrate 5 can be easily replaced by unthreading the member 8 from the member 7 thereby allowing for the substrate 5 to be removed while still allowing for the sheet 3 to remain in place and located by the member 7 and 6.

It is also envisaged that the member 8 may be provided with a head 25 which has the provisions for example receiving a screw driver to allow for the member 8 to be tightly threaded into the member 7. The head 25 may alternatively be provided with a particularly shaped recess or other like provision for receiving a complementary shaped securing means such that only that or the like securing means can fasten and unfasten the member 8. Such can be considered a security feature to prevent tampering and in particular the removal of the member 8 such that the advertising substrate can be removed or tampered with.

FIG. 19 shows a construction having a first member 6 with a threaded bore 30 therein into which a further second member 17 may be engaged. The further second member 17 has a bolt part 31 which is threadingly engageable into the threader bore 30. The second member 7 has a bolt part 32 engagable into a threaded bore 33 in the further second member 17. The second element 7 receives third element 8 as before. In this embodiment the first and second panels may be spaced out from the mounting substrate. Clearly also the threaded core 33 has a diameter and thread as for threader core 30 allowing a stack of further second members 17 provided if desired. It can be seen that the present invention provides an assembly for mounting two or more panels or sheets.

It can be seen that the present invention provides an assembly for mounting two or more panels or sheets and an assembly comprising said panels or sheets and said assembly which will at least provide the public with a useful choice.

What is claimed is:

1. A display assembly comprising:
   two or more panels or sheets with a printed sheet therebetween that is visible through a least one said panel, each said panel having holes or slots therein,
   a plurality of first members mounted to, into or from a support;
   a plurality of second members, each of said second members being threadingly engageable to a respective one of said first members;
   a plurality of third members, each of said third members being threadingly engageable to a respective one of said second members when said second members are threadingly engaged to the respective one of said first members;
   said second members retaining a first one of said panels on said first members, and
   said third members retaining a second one of said panels on said second members and at least one of said third members pierces the printed sheet, and
   wherein said second members each have a flange thereabout which abuts the adjacent face of said first panel about said holes or slots in said second panel through which said second members extend.

2. The assembly as claimed in claim 1, wherein each of said third members has a threaded male member adapted to be pushed through a sheet interposed between said panels.

3. The assembly as claimed in claim 1, wherein said first panel is substantially planar.

4. The assembly as claimed in claim 1, wherein the flange is substantially 0.6 mm thick.

5. The assembly as claimed in claim 1, further comprising at least one spacer element positioned between one of said first members and a one of said second members thereon.

6. The assembly of claim 1, wherein said at least one third member has a threaded male member which is engaged with said second member, a male portion of said at least one third member piercing the printed sheet between the two panels.

7. An assembly for mounting two or more panels or sheets, said assembly comprising:
   a first member for being mounted to, into or from a support,
   a second member threadingly engageable to said mounted first member, and
   a third member threadingly engageable to said second member when said second member is already threadingly engaged to said mounted first member,
   wherein said second member retains a first panel having a hole or slot therein on said first member,
   wherein said third member retains on said second member a second panel having a hole or slot therein, the second member having a flange being of a thickness such that the first and second panels are held closely adjacent without substantial distortion of either panel, and
   wherein a printed sheet is between said panels, wherein said third member extends through the printed sheet, and wherein the printed sheet is visible through at least one of the panels.

8. A display assembly comprising:
   two or more panels or sheets having a printed sheet therebetween, each said panel having holes or slots therein, said printed sheet being visible through at least one said panel,
   a plurality of first members for being mounted to, into or from a support,
   a plurality of second members, each second member being threadingly engageable to said mounted first member and
   a plurality of third members, each third member being threadingly engageable to a said second member when the second member is already threadingly engaged to a said mounted first member,
   wherein said second members retain a first said panel on said first members, the first panel being located by the holes or slots provided therein,
   and wherein said third members retain a second said panel on said second members and at least one of said third members pierces the printed sheet, the second panel being located by the holes or slots, and
   wherein the second member has a flange thereabout which abuts the adjacent face of the first panel about a hole or slot in the second panel through which the second member extends, the flange having a thickness such that the first and second panels are held closely adjacent without substantial distortion of either panel.

9. The assembly of claim 8, wherein said at least one third member has a threaded male member which is engaged with said second member, a male portion of said at least one third member piercing the printed sheet between the two panels.

10. An assembly for mounting two panels or sheets, comprising:
   a first member mounted onto, into or from a support so as to be retained on the support, said first member extending from the support in a first direction, the first member having a female threaded part only;
   a second member threadingly engageable to said first member while said first member is mounted on the support, by relative movement between said second member and said first member in a second direction, the second direction being substantially opposite to the first direction, said second member providing a male threaded part and a female threaded art; and a third member threadingly engageable to said second member when said second member is threadingly engage to said first member by relative movement between said third member and said second member substantially in the second direction, said third member having a head and a male threaded portion only, wherein said second member retains a first panel having a hole or slot therein on said first member, said second member having a flange thereabout of greater diameter than a diameter of said hole or slot in said first panel, and wherein said third member retains a second panel having a hole or slot therein on said second member, said head of said third member has a greater diameter than a diameter of said hole or slot in said second panel.

11. The assembly of claim 10, wherein said third member extends through a sheet of paper interposed between said panels.

12. The assembly of claim 10, comprising a plurality of said second members.

13. The assembly of claim 10, wherein said flange has a thickness such that said first and second panels are held closely adjacent without substantial distortion of either panel.

14. The assembly of claim 10, wherein said flange is thinner than at least one of said first and second panels.

15. A method of mounting two or more panels or sheets comprising the steps of:

providing a first member mounted onto, into or from a support so as to be retained on the support, in a first direction, and with a female threaded part only;

providing a second member threadably engageable with said first member by relative movement between said second member and said first member in a second direction, the second direction being substantially opposite to the first direction, said second member having a male threaded part and a female threaded part, said second member having a flange thereabout;

providing a third member threadably engageable to said second member when said second member is threadfully engaged to said first member by relative movement between said third member and said second member substantially in the second direction, the third member providing a male threaded part only;

retaining a first panel having a hole or slot therein on said first member by threadably engaging said second member to said first member so that said flange abuts an adjacent face of said first panel about said hole or slot, said flange having a diameter greater than a diameter of said hole or slot in said second panel; and retaining a second panel by threadably engaging said third member to said second member through a hole or slot in said second panel, said third member having a head having a diameter greater than a diameter of said hole or slot in said second panel.

* * * * *